United States Patent
Smith et al.

[19]

[11] Patent Number: 5,975,564
[45] Date of Patent: Nov. 2, 1999

[54] FLAT-SEWN PARTITIONED AIRBAG CUSHION

[75] Inventors: Bradley W. Smith, Ogden; J. Kirk Storey, Farmington; Brent K. Olson, Syracuse; Kelly S. Van Hooser, Ogden; Pratricie G. Cochran, Brigham City, all of Utah

[73] Assignee: Autoliv ASP, Inc., Ogden, Utah

[21] Appl. No.: 09/046,444

[22] Filed: Mar. 24, 1998

[51] Int. Cl.⁶ .................................................. B60R 21/24
[52] U.S. Cl. ........................................ 280/729; 280/743.1
[58] Field of Search ............................... 280/729, 743.1, 280/743.2

[56] References Cited

U.S. PATENT DOCUMENTS

| | | |
|---|---|---|
| 3,451,694 | 6/1969 | Hass . |
| 3,614,127 | 10/1971 | Glance ..................................... 280/729 |
| 3,762,741 | 10/1973 | Fleck et al. . |
| 3,784,225 | 1/1974 | Fleck et al. . |
| 3,801,126 | 4/1974 | Knight, IV et al. . |
| 3,930,664 | 1/1976 | Parr et al. . |
| 4,213,634 | 7/1980 | Hoshino et al. . |
| 4,290,627 | 9/1981 | Cumming et al. . |
| 4,300,894 | 11/1981 | Cumming et al. . |
| 5,129,675 | 7/1992 | Wang . |
| 5,282,646 | 2/1994 | Melvin et al. . |
| 5,310,216 | 5/1994 | Wehner et al. . |
| 5,350,188 | 9/1994 | Sato . |
| 5,358,273 | 10/1994 | Onishi et al. . |
| 5,378,019 | 1/1995 | Smith et al. . |
| 5,421,610 | 6/1995 | Kavanaugh et al. . |
| 5,464,250 | 11/1995 | Sato . |
| 5,549,326 | 8/1996 | Rodriguez Ramos . |
| 5,566,977 | 10/1996 | Wipasuramonton . |
| 5,582,429 | 12/1996 | Heinz et al. . |

FOREIGN PATENT DOCUMENTS

| | | |
|---|---|---|
| 3544248 | 1/1987 | Germany . |
| 4311569 | 7/1994 | Germany . |
| 5116575 | 5/1993 | Japan . |
| 6270756 | 9/1994 | Japan . |
| 2265118 | 9/1993 | United Kingdom ................ 280/743.1 |

*Primary Examiner*—Eric D. Culbreth
*Attorney, Agent, or Firm*—Sally J. Brown

[57] ABSTRACT

An airbag cushion which forms a linear arrangement of a plurality of compartements having a rectangular cross sectional shape with opposed longitudinal and lateral surfaces is provided. Each of the compartments is formed by the joinder of at least first and second panel members to form an interior chamber adapted to be filled with an inflation fluid upon deployment of the airbag cushion and a planar partition wall separating the interior chambers of adjacent compartments. The joinder of the at least first and second panel members for each of the compartments is effected from the outside of the compartment interior chambers. A method of fabricating an airbag cushion in the form of a linear arrangement of a plurality of compartments having a rectangular cross sectional shape with opposed longitudinal and lateral surfaces is also provided. The method includes the step of joining together for each compartment at least respective first and second panel members forming an interior chamber adapted to be filled with an inflation fluid upon deployment of the airbag cushion and a planar partition wall separating the interior chambers of adjacent compartments. In accordance with one embodiment of the invention, each such joining is effected from the outside of the respective compartment interior chamber.

3 Claims, 11 Drawing Sheets

FLAT-SEWN PARTITIONED AIRBAG CUSHION

BACKGROUND OF THE INVENTION

The present invention relates generally to inflatable restraint systems and, more particularly, to airbag cushions used in such systems.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Such cushions typically take the form of one or more pieces of fabric sewn to define an interior chamber which receives the inflation gas. It is common that the interior chamber of the cushion be vented to permit controlled deflation of the cushion such as when it is compressed by contact with an occupant's body, and thereby serve to lessen the force of impact. While a simple fabric enclosure may be operable for an airbag cushion, forming an airbag cushion to include several compartments such as by the inclusion of internal partitions to essentially divide the cushion volume into several smaller cushion volumes can be done for various reasons including, for example, controlling inflation of the cushion such as by controlling the pressure differential between compartments during the inflation of the cushion or upon during engagement with the cushion by the occupant; controlling the shape of the cushion, such as during and upon deployment; and controlling deflation of the cushion.

The increased or greater use of compartmentalized airbag cushions has, however, been generally limited due to factors such as the normally greater costs and amounts of time associated with the construction and making of such airbag cushions.

As will be appreciated, the fabrication of compartmentalized airbag cushions typically requires additional stitching to form or create such cushion compartments. Further, such stitching is typically cumbersome and difficult to accomplish. For example, fabrication of a compartmentalized cushion often may require either or both that one or more of the airbag cushion panels or partially sewn airbag cushion compartments be inverted at one or more selected stages in the sewing process. In addition, the partial stitching of a cushion and inversion thereof to continue or complete stitching may not be possible with certain particular cushion designs. Alternatively or in addition, the fabrication of a compartmentalized cushion may typically involve the need to place a portion of a sewing machine or the like piece of fabrication equipment or a projection therefrom into the compartment being formed in order to complete the fabrication, e.g., sewing, associated therewith. It will further be appreciated that such stitching and fabrication steps generally additionally necessitate one or more various manual operations. At best, previous compartmentalized airbag cushion designs have typically required a great deal of folding, bending and other manual manipulations if internal compartments are to be to stitched formed therein. As a result, lower cost and typically more consistent automated manufacture of such airbag cushions may be effectively precluded. Further, such labor-intensive manual assembly can result in such a compartmentalized airbag cushion being cost prohibitive.

SUMMARY OF THE INVENTION

A general object of the invention is to provide an improved airbag cushion and associated method of making such an airbag cushion.

A more specific objective of the invention is to overcome one or more of the problems described above.

The general object of the invention can be attained, at least in part, through an airbag cushion which forms a linear arrangement of a plurality of compartments having a rectangular cross sectional shape with opposed longitudinal and lateral surfaces. Each of the compartments is formed by the joinder of at least first and second panel members to form an interior chamber adapted to filled with an inflation fluid upon deployment of the airbag cushion and a planar partition wall separating the interior chambers of adjacent compartments. The joinder of the at least first and second panel members for each of the compartments is effected from the outside of the compartment interior chambers.

The prior art fails to provide a compartmentalized airbag cushion which is of as simple as desired design and construction. Further, the manufacture of prior compartmentalized airbag cushion designs typically has involved or required various relatively complex manual manipulations such as involving the inversion of the airbag cushion under construction, at one or more stages in the manufacturing process. As a result, the costs of compartmentalized airbag cushions made in accordance with such prior designs has often been greater than desired to economically permit the greater or more widespread use of compartmentalized airbag cushions in various inflatable restraint system installations.

The invention further comprehends an airbag cushion which includes a plurality of compartments each forming an interior chamber. Each of the compartments is adjacent at least one other of the compartments with a planar partition wall separating the interior chambers of each pair of adjacent compartments and permitting gas passage between the interior chambers of such adjacent compartments. Each of the compartments and planar partition walls are formed by essentially straight line sewing of at least first and second panel members from the outside of the respective compartment.

The invention still further comprehends a method of fabricating an airbag cushion in the form of a linear arrangement of a plurality of compartments having a rectangular cross sectional shape with opposed longitudinal and lateral surfaces. The method includes the step of joining together, for each compartment, at least respective first and second panel members forming an interior chamber adapted to be filled with an inflation fluid upon deployment of the airbag cushion and a planar partition wall separating the interior chambers of adjacent compartments. In accordance with one embodiment of the invention, each such joining is effected from the outside of the respective compartment interior chamber.

Other objects and advantages will be apparent to those skilled in the art from the following detailed description taken in conjunction with the appended claims and drawings.

DETAILED DESCRIPTION OF THE INVENTION

An airbag cushion, generally designated by reference numeral 10 and in accordance with one preferred embodiment of the invention, is shown in FIGS. 1–4. The airbig cushion 10 is intended for use as a passenger restraint in a vehicle (not shown), as part of an airbag passive restraint system. The cushion 10 is connected to an inflator 12 such as in a manner known in the art with the drawings having been simplified by not showing the specifics of such customary or usual form of connection or attachment. If desired, the cushion 10 may additionally be joined or connected to a protective and/or decorative housing (not shown) to form a module mounted within the cabin of the vehicle. This module may be located in the cabin such that, when inflated, the cushion 10 is located to the front of the vehicle occupant to protect against frontal collisions, or may be mounted to the side of the vehicle occupant to protect against lateral collisions.

Figure 1:
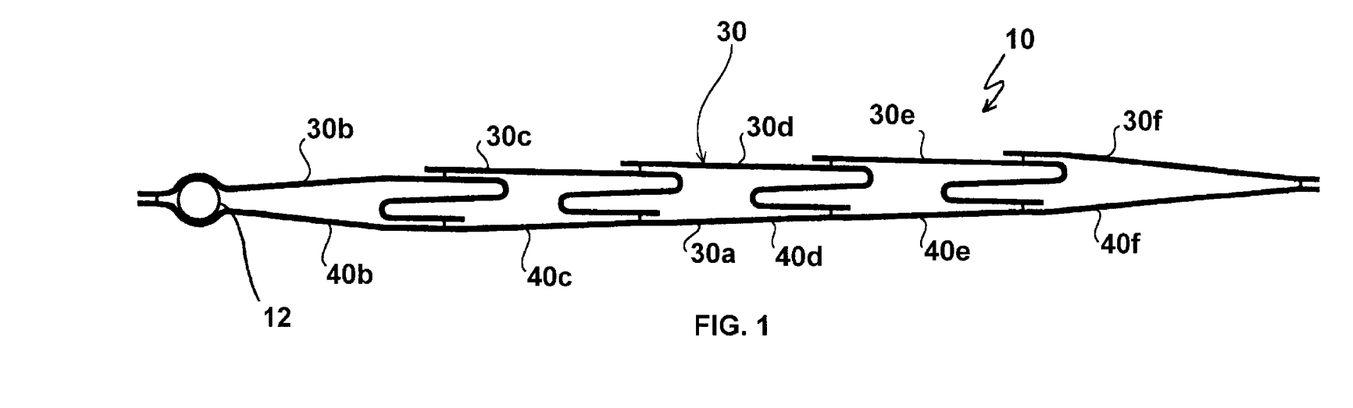
FIG. 1 is a simplified cross sectional view of a compartmentalized airbag cushion with inflator in accordance with one embodiment of the invention in an uninflated state.
Figure 3:
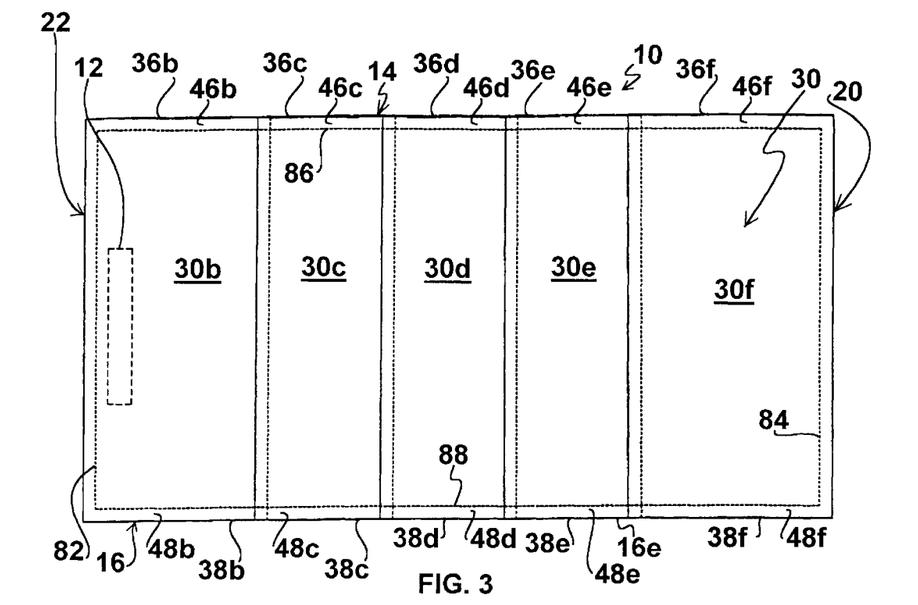
FIG. 3 is a top plan view of the compartmentalized airbag cushion of FIG. 1.
Figure 4:
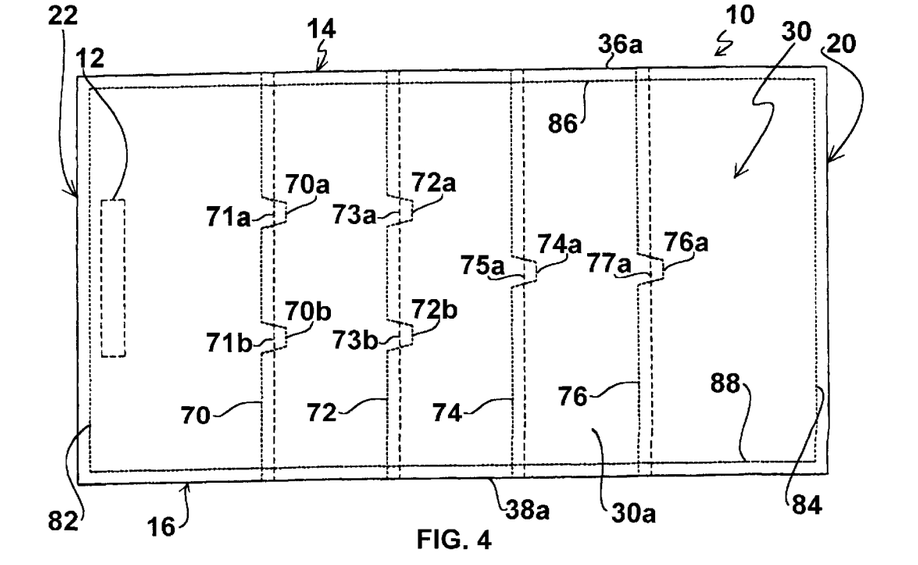
FIG. 4 is a bottom plan view of the compartmentalized airbag cushion of FIG. 1.

The cushion 10 in the uninflated state of FIGS. 1, 3 and 4 takes a generally rectangular form and, as shown in FIGS. 3 and 4, includes first and second length ends 14 and 16, respectively, and first and second width ends 20 and 22, respectively. In keeping with the generally rectangular form, the first and second width ends 20 and 22 extend between the first and second length ends 14 and 16. As will be made more clear below, the length ends may be longer, shorter, or equal in length to the width ends, depending upon the particular orientation and use of the cushion 10. It will be appreciated that airbag cushions in accordance with the invention may also take, for example, the form of a square if desired. In addition, while the first length end 14 is shown as uppermost in the figures, this is not required, and one of the width ends may be uppermost.

Figure 2:
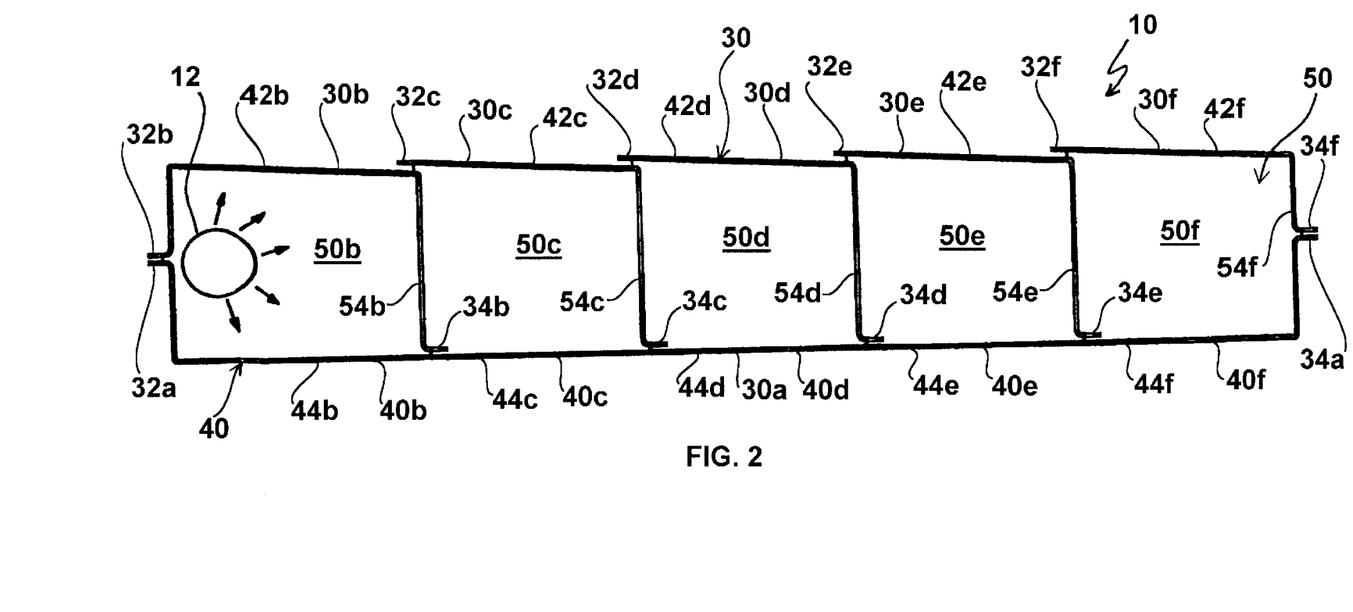
FIG. 2 is a simplified cross sectional view of the compartmentalized airbag cushion with inflator of FIG. 1 in a substantially inflated state.

The cushion 10 is formed from a plurality of panels or strips of a flexible airbag cushion material, generally designated by the reference numeral 30 and including a bottom panel 30a and a series of overlying panels, individually designated 30(b-f). As shown in FIGS. 2–4, each of the panels 30(a-f) includes first and second opposed longitudinal ends 32(a-f) and 34(a-f), respectively, and first and second opposed lateral ends 36(a-f) and 38(a-f), respectively.

As will be appreciated, such panels or strips of flexible airbag cushion material can be composed one of the various types of fabric such as known in the art, or a film formed of plastic, rubber or similar material. As such, the term "airbag cushion material" is specifically intended to include fabrics. The airbag cushion material may be impervious to gas, or porous to some predetermined extent. As is known in the art, partially porous materials permit the inflation gas filling the cushion to escape at a determinable rate, and thus may be desirable to provide particular cushioning characteristics. Additionally, the porosity of individual panels may vary between panels, or may vary within each panel. Such variation of porosity may be provided by using different types of airbag cushion material (for example, different panels being formed of different materials), by specifically applying a coating to one or more particular panels (such as a discontinuous coating applied to provide different porosity within a single panel), or by some other appropriate and selected arrangement, for example.

Turning specifically to FIGS. 1 and 2, the airbag cushion 10 constitutes a linear arrangement of a plurality of compartments, generally designated 40 and individually designated 40(b-f). As shown in FIGS. 2 and 3, each compartment 40 has a generally rectangular cross sectional shape and is composed of opposed first and second longitudinal surfaces 42(b-f) and 44(b-f), respectively, and opposed first and second lateral surfaces 46(b-f) and 48(b-f), respectively. It will be appreciated that in a so formed airbag cushion, a single panel member, i.e., the bottom panel 30a, forms at least one of the longitudinal surfaces of each of the compartments 40. The compartments 40 form interior chambers, generally designated 50, with each compartment 40(b-f) forming an interior chamber individually designated 50(b-f), respectively, shown in FIG. 2. The interior chambers 50(b-f) are adapted to be filled with an inflation fluid upon deployment of the airbag cushion 10. The airbag cushion 10 includes generally planar partition walls, generally individually designated 54(b-f), separating the respective interior chambers 50(b-f) of respective adjacent compartments 40(b-f). Such partition walls can be modified such as by or through the inclusion of one or more selectively sized vent holes to permit and facilitate the passage of gas between adjacent compartments. As will be appreciated, the number, size, shape and placement of such vent holes can be appropriately selected to provide particular design vent characteristics between adjacent compartments.

When in its manufactured condition, the airbag cushion 10 has a generally flat appearance as illustrated in FIG. 1 with a thickness about that of a few panels of airbag cushion material. In practice, such an airbag cushion 10 may be folded, such as in a manner as is known in the art, for installation in a respective vehicle.

The panels 30 are attached or connected together to form the cushion 10. As will be appreciated the size of each respective panel as well as the number of panels in a particular airbag cushion design can be appropriately varied and selected to provide or result in an airbag cushion having either or both a particular desired size or shape. The number of panels 30 used in the illustrated embodiment and their position with respect to each other upon fabrication is apparent from FIGS. 1–4. In general, to simplify design and fabrication, it will be desirable that at least each of the overlying panels 30(b-e) be similarly sized and shaped. In the illustrated embodiment, the end overlying panel 30f is shown to be of a different size and shape than the overlying panels (b-e) but it will be appreciated that such design could be further simplified by the making of each of the overlying panels 30(b-f) of the same size and shape, if desired.

While various techniques for securing together the respective edges of particular panels may be used including, for example, sewing and, assuming use of appropriate heat sealable materials, heat sealing. In practice, however, the invention is believed to be particularly beneficial when the panels are joined or secured together via the application of a sewing technique which uses stitching to secure together respective panels and essentially straight seams along the edges thereof. The practice of the invention using a sewing fabrication technique is further enhanced in that such sewing fabrication can desirably be accomplished using flat sewing techniques wherein particular panels to be sewn together are laid flat at the point or along the line of joinder and thus such sewing is more conducive to automated manufacture.

As will be described further below and in accordance with a preferred embodiment of the invention, the joinder or attachment of the panels 30 so as to form the compartments 40 is desirably simply effected from the outside of the compartment interior chambers 50. As a result, the invention permits the fabrication of such a compartmentalized airbag cushion without necessitating complicated handling such as associated with inversion of one or more of the airbag cushion panels or partially sewn airbag cushion compartments at one or more selected stages in the sewing process or the need to place a portion of a sewing machine or a projection therefrom into the compartment being formed in order to complete the sewing of the compartment.

The arrangement and the attachment of the panels 30 to form the airbag cushion 10 will now be described in greater detail below with specific reference to FIGS. 5–12.

Figures 5, 6, 12:
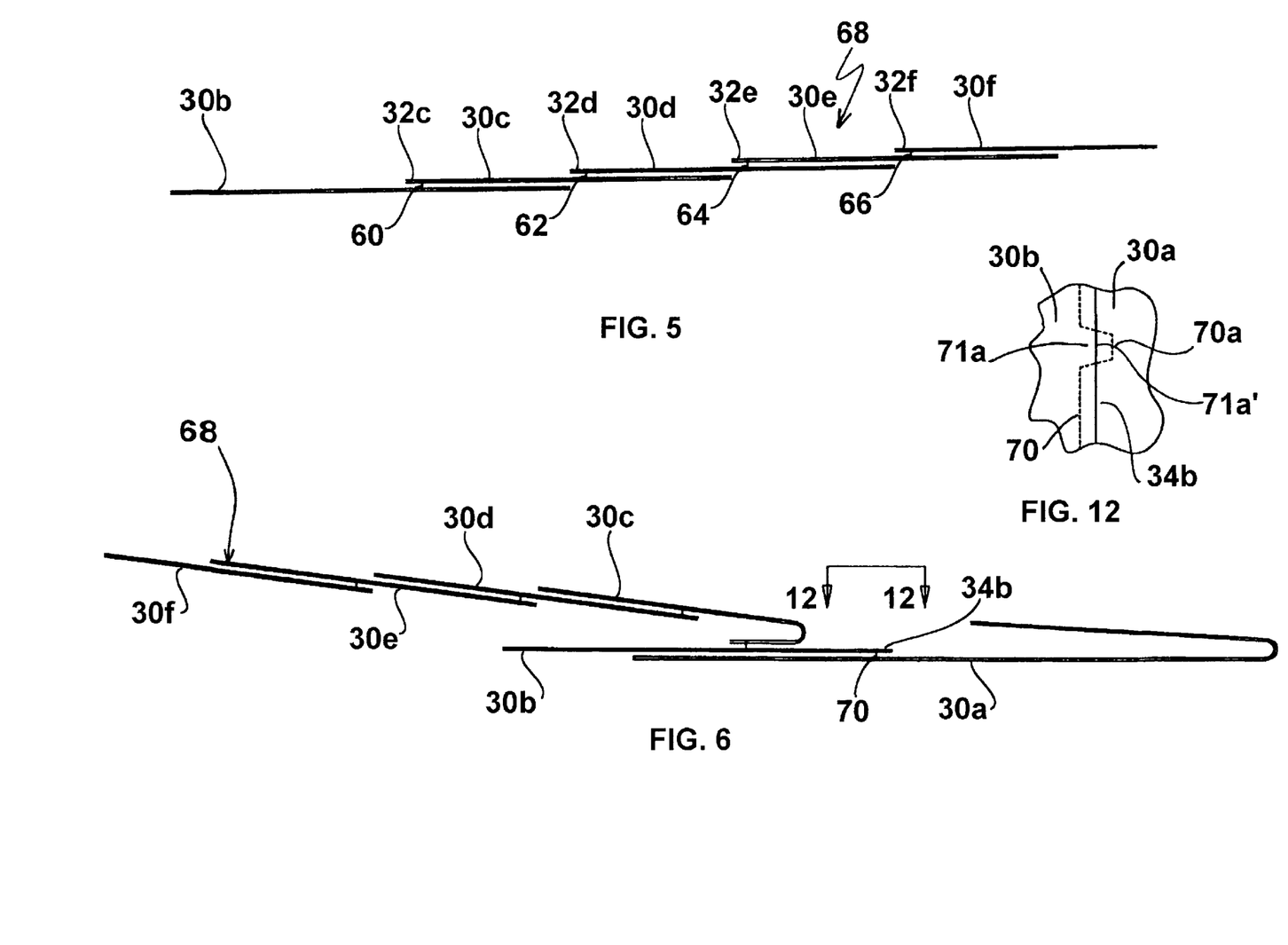
FIGS. 5–11 are simplified cross sectional views of the compartmentalized airbag cushion of FIGS. 1–4 in successive stages of the fabrication process.
FIG. 12 is a detailed fragmentary view taken substantially along the lines 12—12 of FIG. 6.

First, the panels 30(b-f) are stacked and adjacent panels sewn together via the essentially straight stitch seams 60, 62, 64, and 66, respectively, to form an overlying panel assembly, generally designated by the reference numeral 68, as shown in FIG. 5. In the panel assembly 68, the first longitudinal edge 32c of the panel 30c is secured via a stitch seam 60 to the adjacent panel 30b along the central portion of the panel 30b. Similarly, the first longitudinal edge 32d of the panel 30d is secured via a stitch seam 62 to the adjacent panel 30c along the central portion of the panel 30c. In a similar manner, the panel edges 32e and 32f of panels 30e and 32f, respectively, are joined or secured to the central portions of adjacent panels 30d and 30e, respectively, via respective stitch seams 64 and 66.

Then, as shown in FIG. 6, the panel assembly 68 is placed in overlying relationship with the bottom panel 30a. The panels 30(c-f) are folded back, as shown in FIG. 6, to permit the second longitudinal edge 34b of the panel 30b to be sewn to the bottom panel 30a via a stitch seam 70. In accordance with one embodiment of the invention, such a stitch seam is an essentially straight seam. The seam 70, however, as shown in FIG. 4, has a sew path which includes a first and second, generally trapezoidal departures, individually designated 70a and 70b, from such a straight line seam. Such a sew path results in the panel edge 34b not being joined to the bottom panel 30a at panel edge sections 71a and 71b.

The nature of the generally trapezoidal departures from a straight line seam may better be appreciated from a consideration of FIG. 12 where the departure 70a is shown in an enlarged detailed view. As a result of such a sewing pattern, the panel members 30b and 30a are not sewn together along the seam at the panel edge section 71a, resulting in a passage opening 71a'. Such a passage opening serves to connect the adjacent airbag cushion compartments 50b and 50c, shown in FIG. 2, for example.

It will be appreciated that upon deployment, a so formed passage opening will serve to permit or allow gas passage and flow within the airbag cushion in only a direction away from the inflator device. That is, though the passage opening 71a' permits gas flow from the compartment 50b to the compartment 50c, the construction of the passage opening acts to avoid, prevent or minimize gas flow from the compartment 50c to the compartment 50b. More specifically, even should the pressure within the compartment 50c exceed the pressure within the compartment 50b, such as may occur post-deployment when an external force is applied to the compartment 50c such as in the event of contact with an individual, the panel edge section 71a supported by the trapezoidal sew path will be forced against the adjacent panel member, i.e., panel 30a, and thus avoid, prevent or minimize gas flow from the compartment 50c to the compartment 50b.

It will be appreciated that in accordance with one embodiment of the invention, a more continuous sewing process can be used in the fabrication of an airbag cushion by means of the inclusion of such sew path. It will further be appreciated by those skilled in the art that with respect to such departures from a straight line sewing path, parameters such as the specific shape, size and number of such departures from a straight line sewing path can be varied and selected to provide desired airbag cushion performance characteristics.

Figure 7:
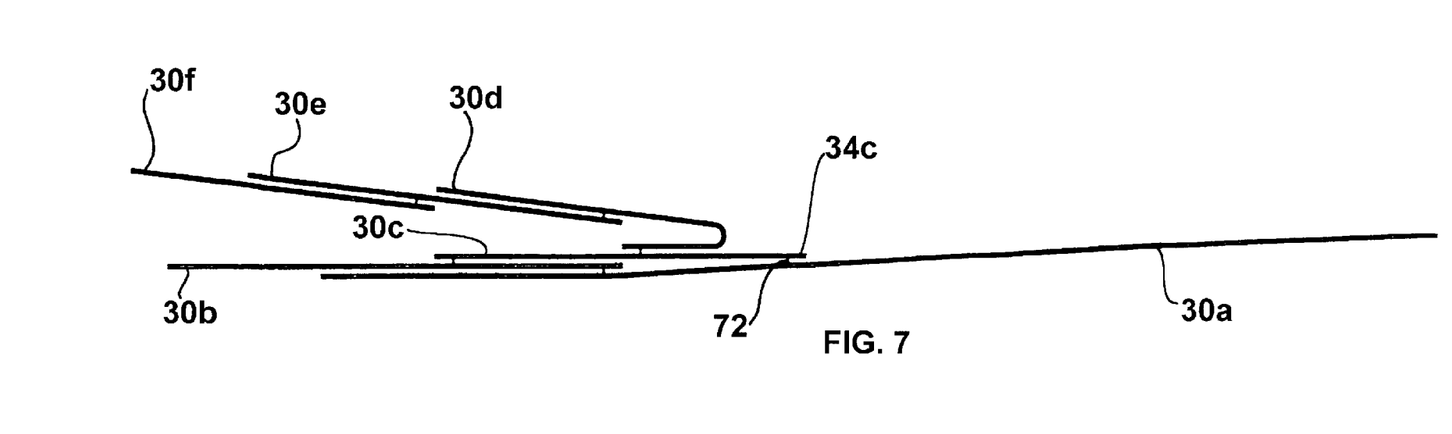

FIG. 7 illustrates a next step or stage in the fabrication process. In accordance therewith, panels 30(d-f) are folded back to permit the second longitudinal edge 34c of the panel 30c to be sewn to the bottom panel 30a via a stitch seam 72. The stitch seam 72, as shown in FIG. 4 and similar to the seam 70 described above, follows a sew path which includes a first and second, generally trapezoidal departures, individually designated 72a and 72b, from such a straight line seam. Such a sew path results in the panel edge 34c not being joined to the bottom panel 30a at panel edge sections 73a and 73b.

Figure 8:
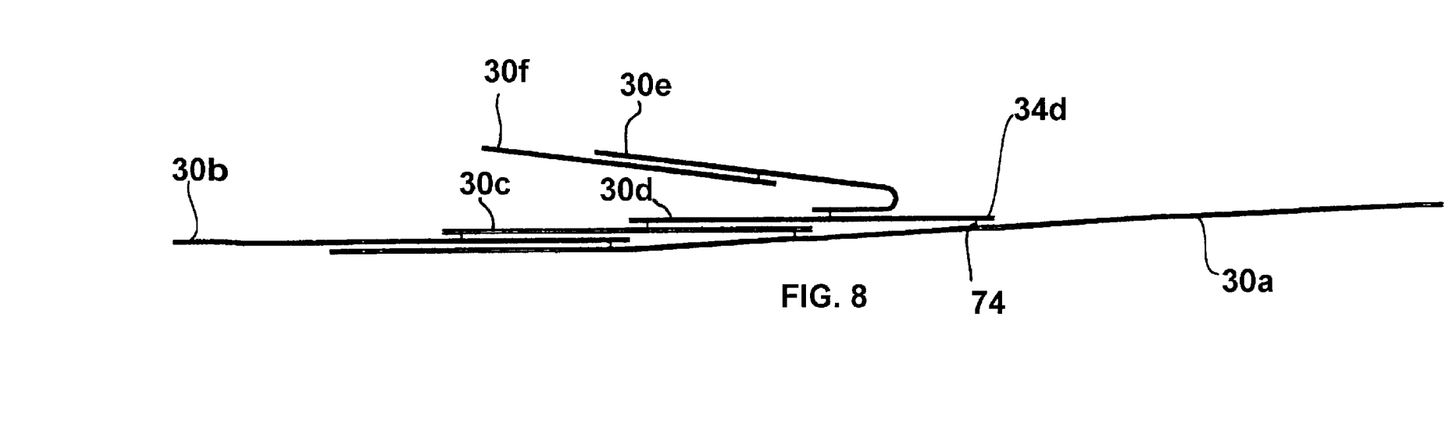

Subsequently, panels 30e and 30f are folded back, as shown in FIG. 8, to permit the second longitudinal edge 34d of the panel 30d to be sewn to the bottom panel 30a via a stitch seam 74. The stitch seam 74, as shown in FIG. 4 and similar to the seams 70 and 72 described above, follows a sew path which departs from a straight line seam. The stitch seam 74, however, includes only a single such generally trapezoidal departure 74a from such a straight line seam, resulting in the panel edge 34d not being joined to the bottom panel 30a at the panel edge section 75a.

Figure 9:
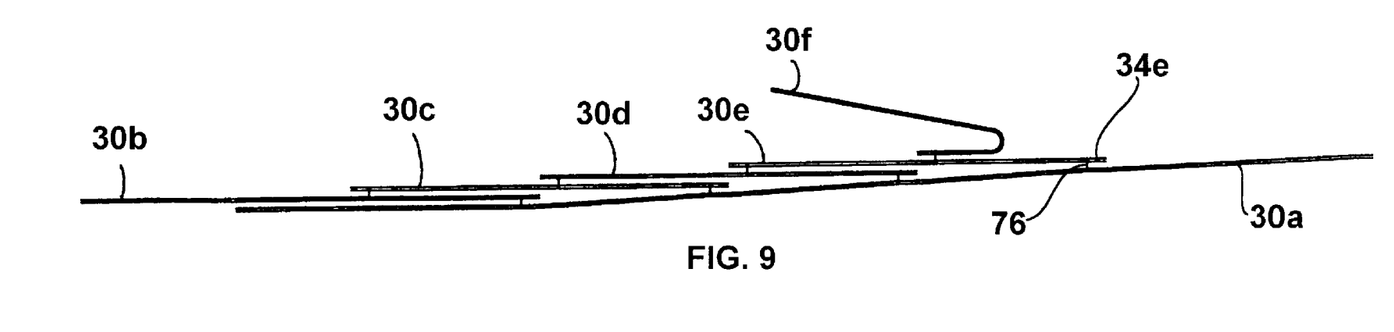
Figure 10:
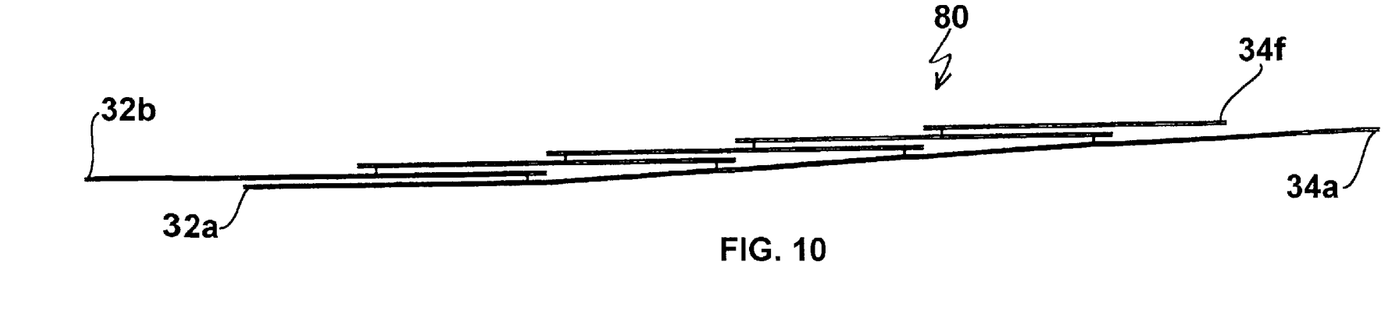

Finally, the panel 30f is folded back, as shown in FIG. 9, to permit the second longitudinal edge 34e of the panel 30e to be sewn to the bottom panel 30a via a stitch seam 76 and resulting in partially sewn airbag cushion assembly 80 shown in FIG. 10. The stitch seam 76, as shown in FIG. 4 and similar to the seam 74 described above, follows a sew path which includes a single generally trapezoidal departure 76a from a straight line seam, resulting in the panel edge 34e not being joined to the bottom panel 30a at the panel edge section 77a.

Figure 11:
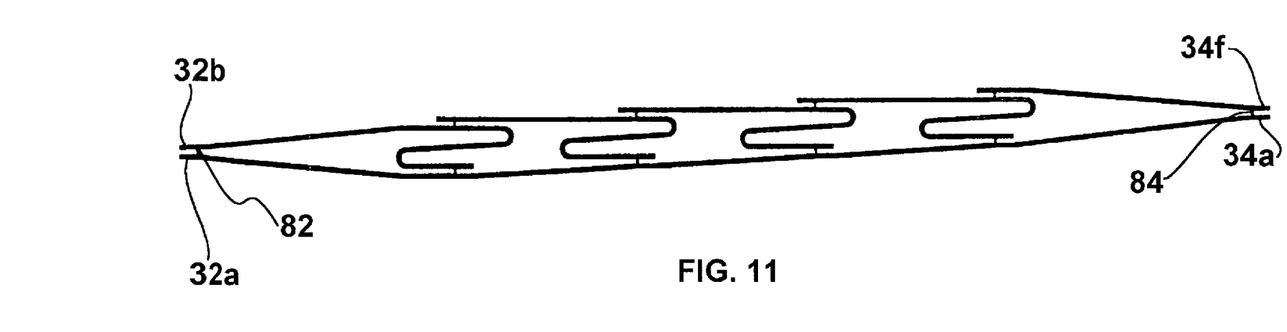

The partially sewn airbag cushion assembly 80 is aligned and arranged, as described in greater detail below relative to FIG. 11, with the panel edge 32b aligned with the panel edge 32a and with the panel edge 34f aligned with the panel edge 34a. The entire airbag cushion perimeter is then sewn using an essentially straight line stitch seams 82 and 84 to attach or join panel edge 32b with panel edge 32a and panel edge 34f with panel edge 34a, respectively, as shown in FIGS. 3, 4 and 11; and essentially straight line stitch seams 86 and 88 to attach or join panel edge 36a with panels edges 36(b-f) and panel edge 38a with panel edges 38(b-f), respectively.

As will be appreciated, the inflator 12 may be inserted during this step or, as is known in the art, an opening (not shown) may be incorporated in the airbag cushion assembly, to permit the later insertion of such an inflator.

It will be appreciated that in accordance with the invention, the joinder or attachment of the panels 30 so as to form the compartments 40 is relatively simply effected from the outside of the compartment interior chambers 50. As a result, the invention facilitates the flat sewn fabrication of compartmentalized airbag cushion such as by avoiding complicated handling maneuvers such as associated with inversion of one or more of the airbag cushion panels or partially sewn airbag cushion compartments at one or more selected stages in the sewing process or the need to place a portion of a sewing machine or a projection therefrom into the compartment being formed in order to complete the sewing of the compartment. In view thereof, the invention may more easily permit, allow or facilitate the utilization of automated manufacture in association with the fabrication of compartmentalized airbag cushions. Further, is a result of the use of such greater use of generally lower cost and more consistent automated manufacture, the need or use of labor-intensive manual labor for the fabrication of compartmentalized airbag cushions can desirably be minimizing or avoided.

Figure 13:
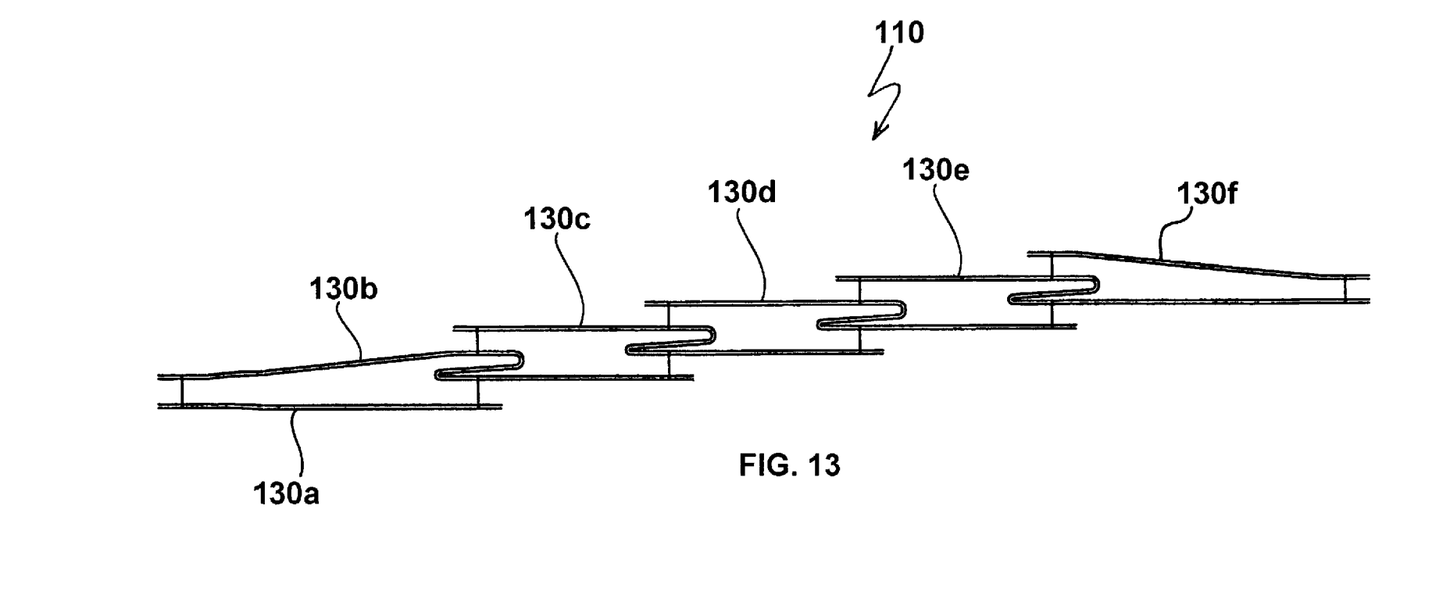
FIG. 13 is a simplified cross sectional view of a compartmentalized airbag cushion in accordance with an alternative embodiment of the invention in an uninflated state.
Figure 14:
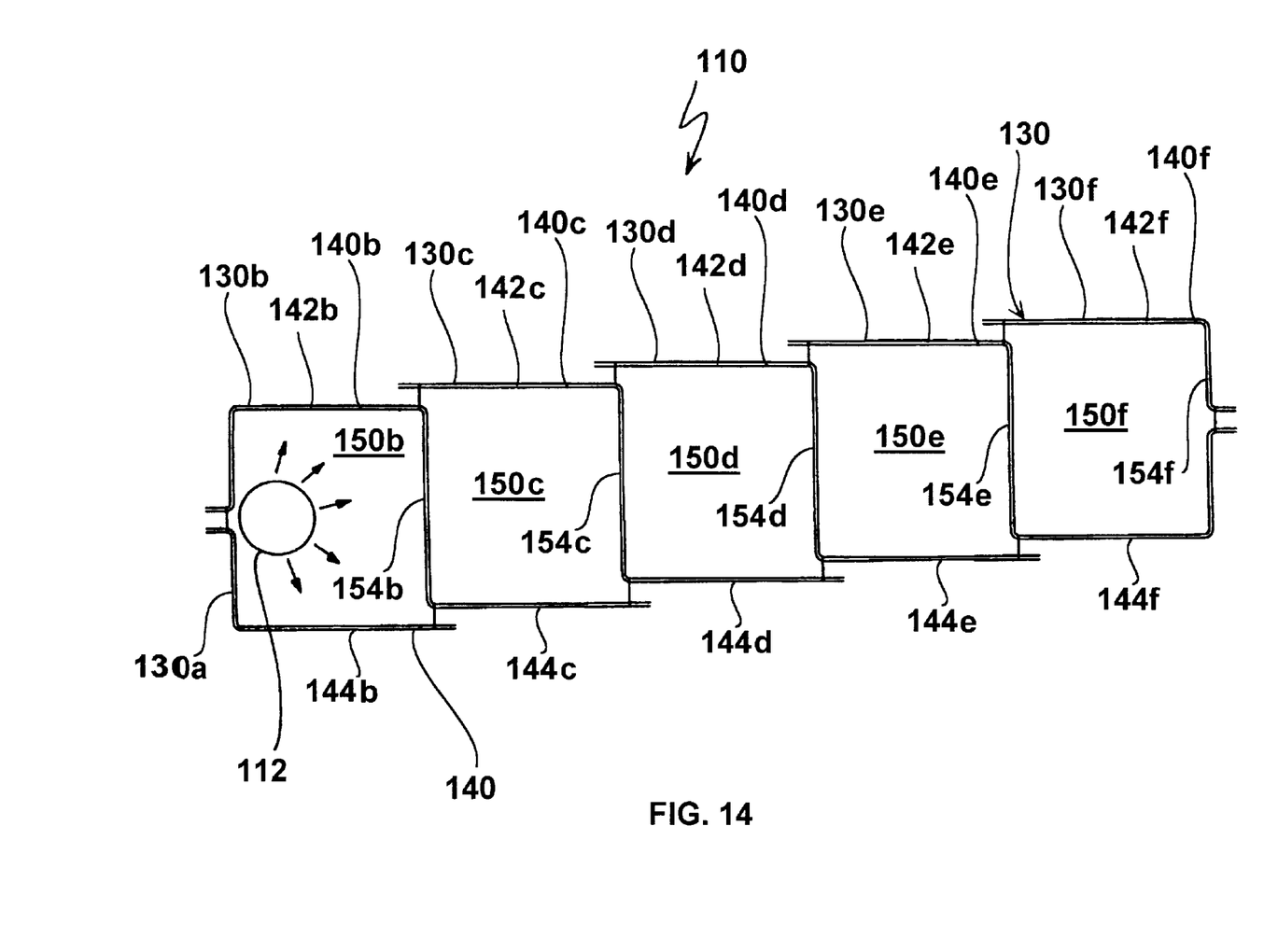
FIG. 14 is a simplified cross sectional view of the compartmentalized airbag cushion of FIG. 13 with inflator, in a substantially inflated state.

Turning now to FIGS. 13 and 14, there is illustrated an airbag cushion, generally designated by reference numeral 110 in accordance with an alternative embodiment of the invention.

The airbag cushion 110, similar to the airbag cushion 10 described above, is intended for use as a passenger restraint in a vehicle (not shown), as part of an airbag passive restraint system. The cushion 110 is connected to an inflator 112 (shown in FIG. 14). As with the above-described embodiment, such connection can be effected such as in a manner known in the art and the drawings have been simplified by not showing the specifics of such customary or usual form of connection or attachment.

The cushion 110 is formed from a plurality of panels or strips of a flexible airbag cushion material such as described above. These panels are generally designated by the reference numeral 130 and individually designated by the reference characters 130(a-f).

As shown in FIG. 14, the airbag cushion 110 constitutes a linear arrangement of a plurality of compartments, generally designated 140 and individually designated 140(b-f). The compartments 140 are generally similar to the compartments 40 described above in that each of the compartments 140 has a generally rectangular cross sectional shape and is composed of opposed first and second longitudinal surfaces 142(b-f) and 144(b-f), respectively, and opposed first and second lateral surfaces (not shown). Each of the compartments 140(b-f) forms an interior chamber, individually designated 150(b-f), respectively. The interior chambers 150(b-f) are adapted to filled with an inflation fluid upon deployment of the airbag cushion 110. The airbag cushion 110 includes generally planar partition walls, designated 154(b-f), separating the respective interior chambers 150(b-f) of respective adjacent compartments 140(b-f).

In this embodiment, it will be appreciated that for each of the compartments 140(b-f), a single panel member forms at least one of the opposed longitudinal compartment surfaces and a partition wall separating the interior chambers of adjacent compartments. For example, for the compartment 140c, the panel member 130c forms the longitudinal compartment surface 142c and the partition wall 154c. Similarly, the panel member 130d forms the longitudinal surface 142d and the partition wall 154d relative to compartment 140d. Even for the end compartment 140f, the panel member 130e forms the longitudinal surface 144f and the partition wall 154e.

When in its manufactured condition, the airbag cushion 110 has a generally flat appearance as illustrated in FIG. 13 with a thickness about that of a few panels of airbag cushion material. In practice, such an airbag cushion 110 may be folded, such as in a manner as is known in the art, for installation in a respective vehicle.

The panels 130(a-f) are attached or connected together to form the cushion 110. As will be appreciated the size of each respective panel as well as the number of panels in a particular airbag cushion design can be appropriately varied and selected to provide or result in an airbag cushion having either or both a particular desired size or shape. The number of panels used in the illustrated embodiment and their position with respect to each other upon fabrication is apparent from the drawings, particularly FIGS. 13 and 14.

In a preferred embodiment of this version of the subject airbag cushion, the cushion 110 is fabricated from panels of only two sizes, i.e., panels of a first size used as the end panels 130a and 130f, respectively, and panels of a second size used as the central panels 130(b-e).

Again, while various techniques for securing together the respective edges of particular panels may be used, practice of the invention is believed to be particularly beneficial when the panels are joined or secured together via the application of a sewing technique which uses stitching to secure together respective panels and essentially straight seams along the edges thereof where the joinder or attachment of the panels 130(a-f) so as to form the compartments 140(b-f) is desirably simply effected from the outside of the compartment interior chambers 150(b-f), respectively.

The arrangement and the attachment of the panels 130(a-f) to form the airbag cushion 110 will now be described in greater detail below with specific reference to FIGS. 15–23.

Figure 15:
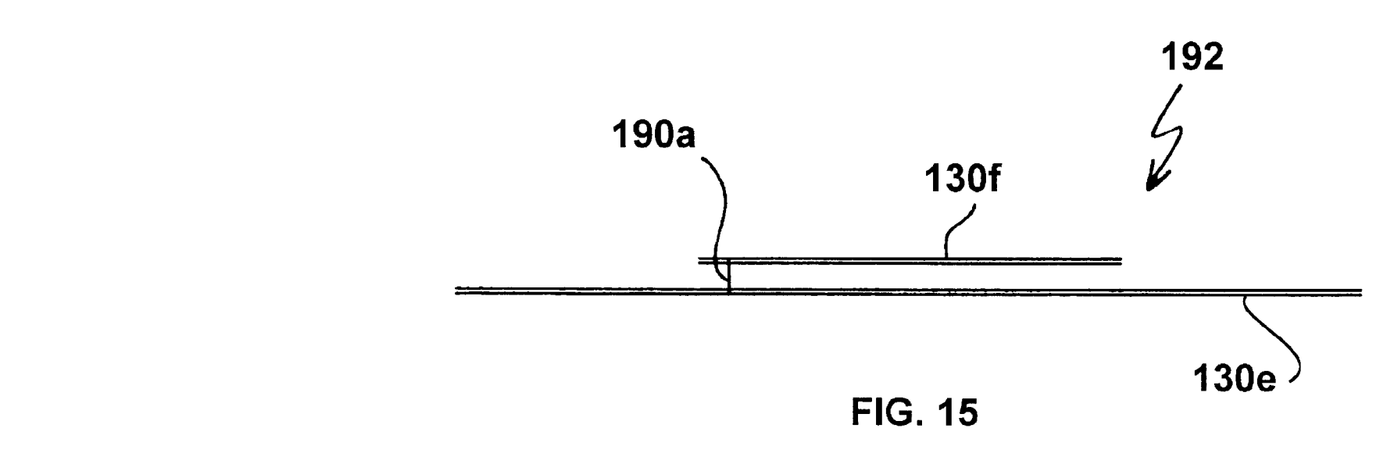
FIGS. 15–23 are simplified cross sectional views of the compartmentalized airbag cushion of FIG. 13 in successive stages of the fabrication process.

First, each of the end panels is stacked with and sewn to the adjacent corresponding central panel. FIG. 15 shows the end panel 130f stacked with and sewn to the adjacent corresponding central panel 130e via the essentially straight stitch seam 190a to form a first airbag cushion end assembly 192. It will be appreciated that a similar second airbag cushion end assembly, designated by the reference numeral 194 and shown in FIG. 18, will also be formed for the opposed end of the airbag cushion 110.

Figure 16:
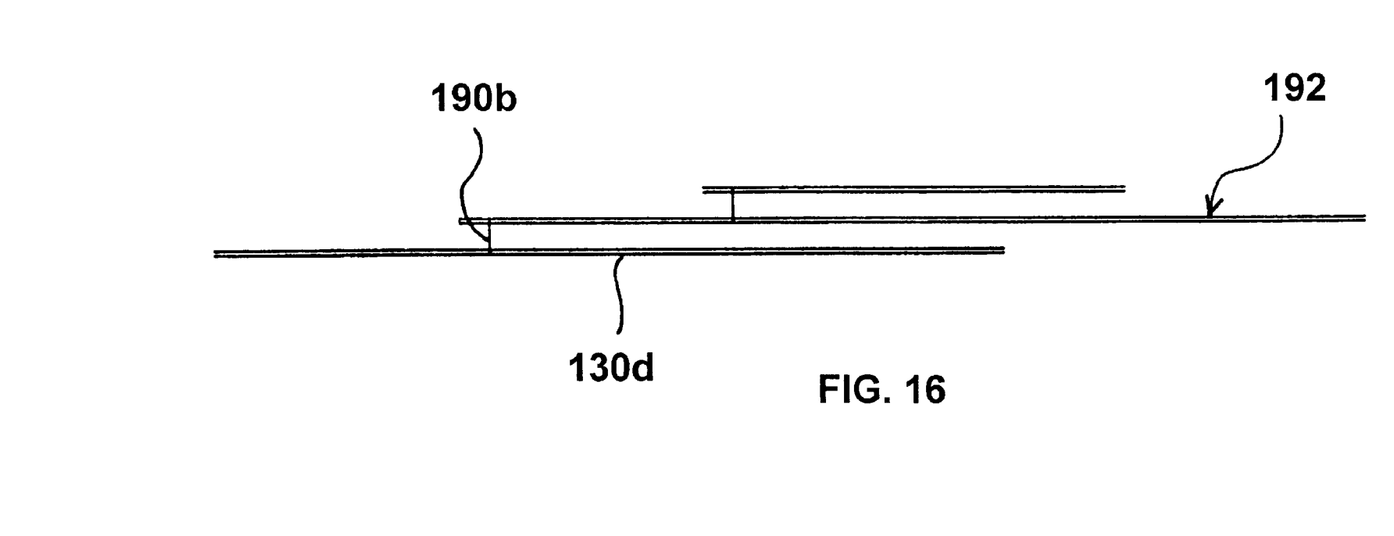
Figure 17:
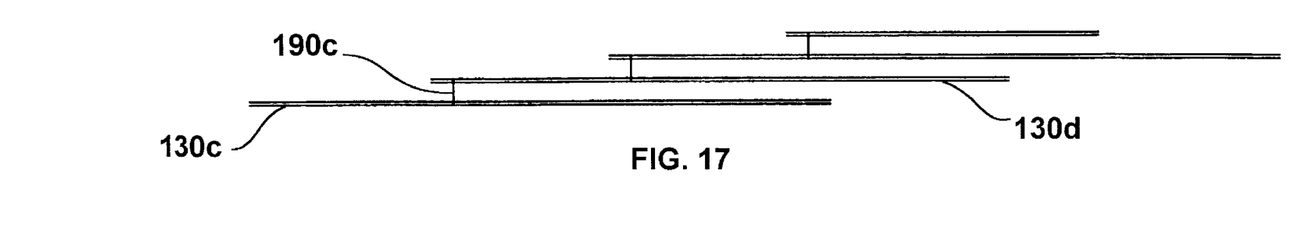

Then, as shown in FIG. 16, the first airbag cushion end assembly 192 is sewn to the central panel 130d via the essentially straight stitch seam 190b. Subsequently, as shown in FIG. 17, the central panel 130d is sewn to the central panel 130c again desirably via an essentially straight stitch seam 190c.

Figure 18:
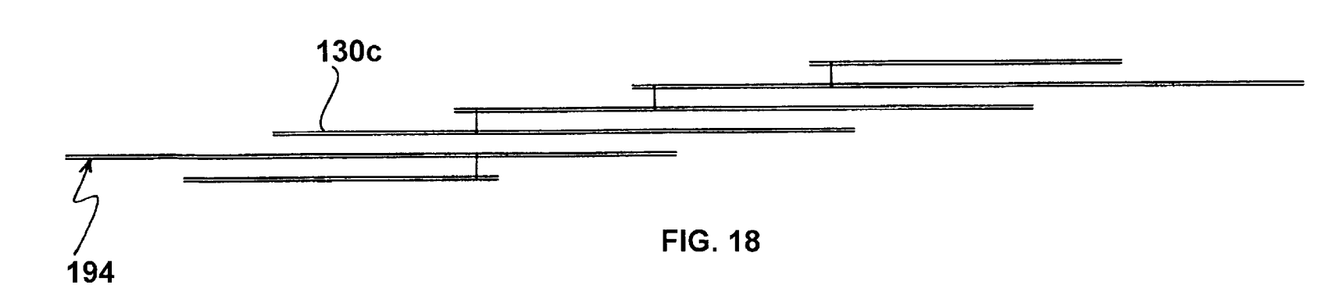
Figure 19:
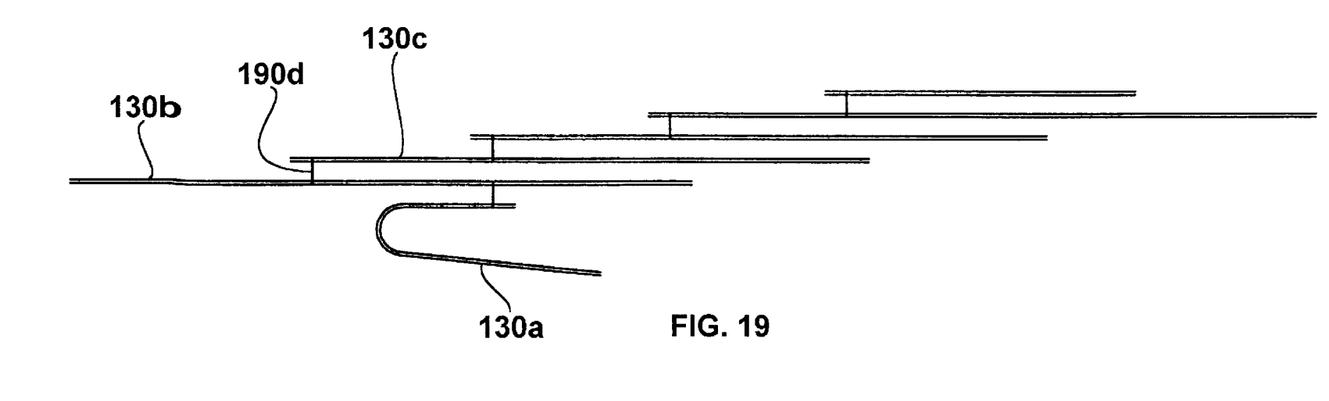

At this juncture in the assembly process, the second airbag cushion end assembly 192 is orientated relative to the central panel 130c as shown in FIG. 18. Then the end panel 130a is folded back, as shown in FIG. 19, and the central panel 130b is sewn to the central panel 130c via the straight stitch seam 190d.

Figure 20:
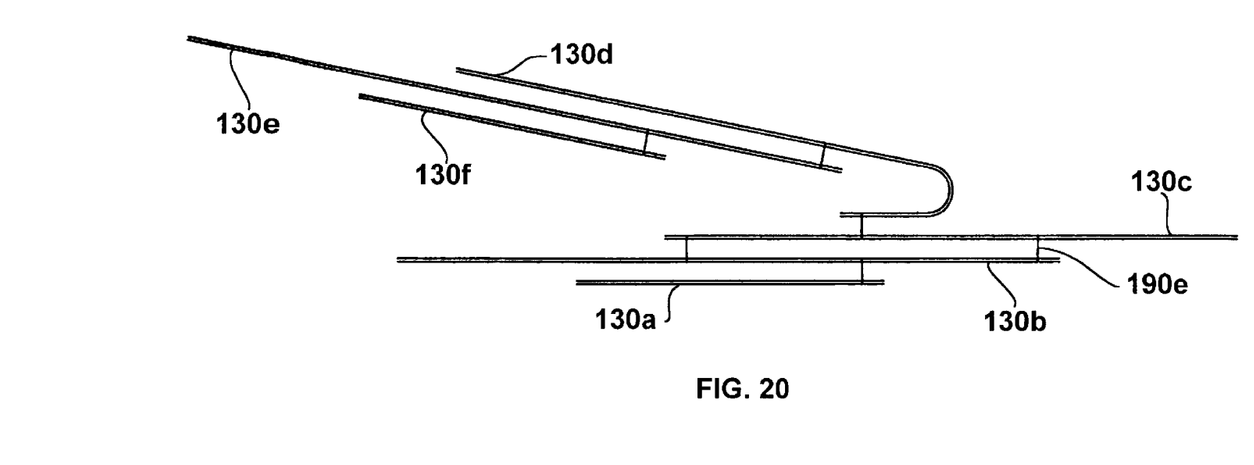

Subsequently, as shown in FIG. 20, panels 130f, 130e and 130d are folded back and central panel 130b is again sewn to the central panel 130c, now via the straight stitch seam 190e.

Figure 21:
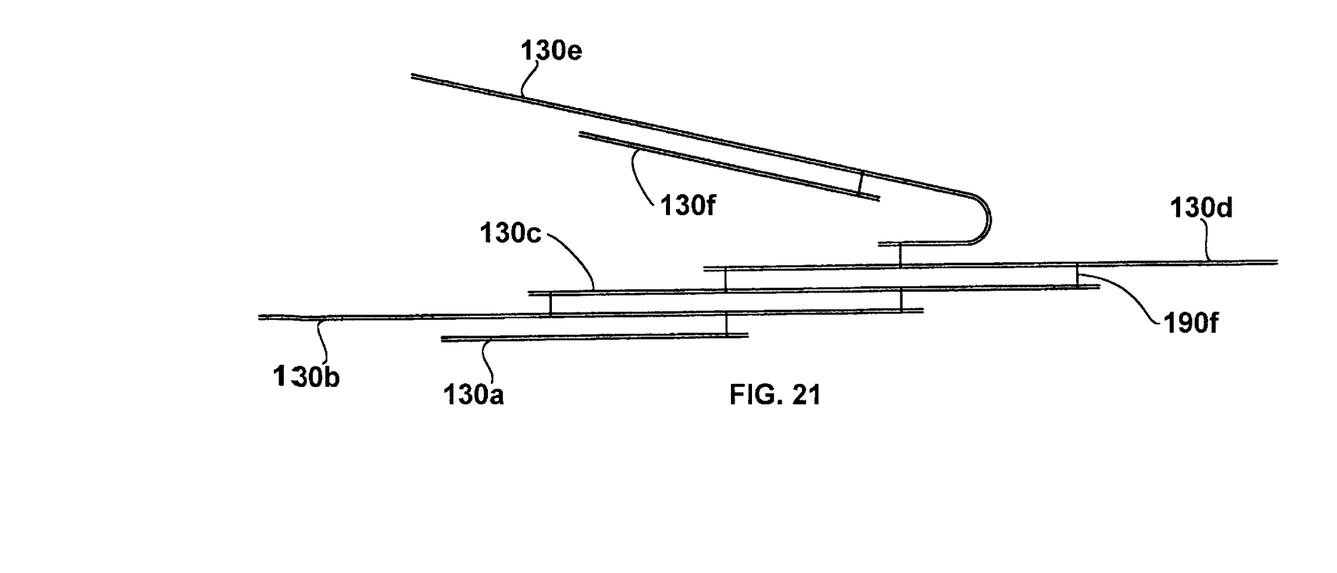

As shown in FIG. 21, the panels 130f and 130e are next folded back and the central panel 130d is again sewn to the central panel 130c, this time via the straight stitch seam 190f.

Figure 22:
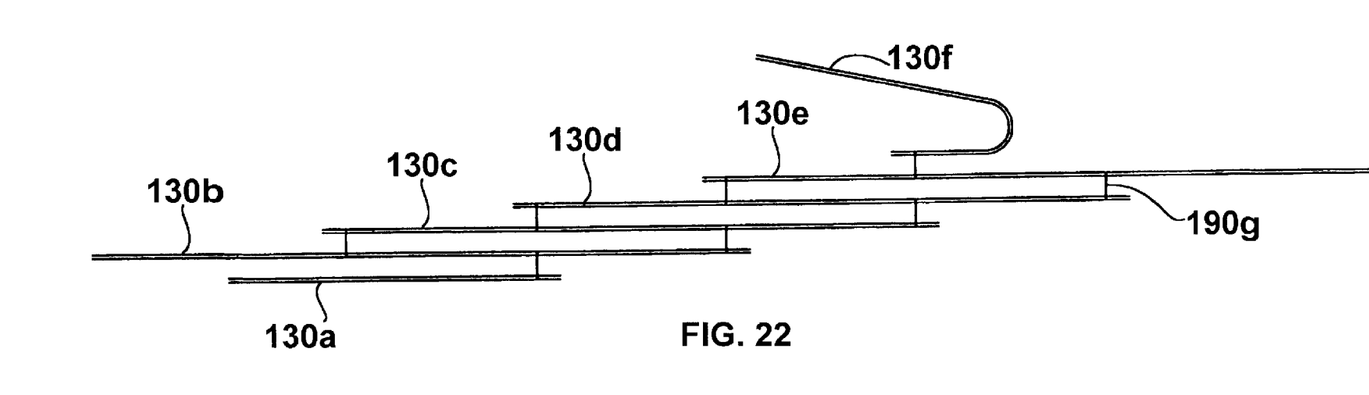

Then, as shown in FIG. 22, the end panel 130f is folded back and the central panel 130e is again sewn to the central panel 130d, this time via the straight stitch seam 190g.

Figure 23:
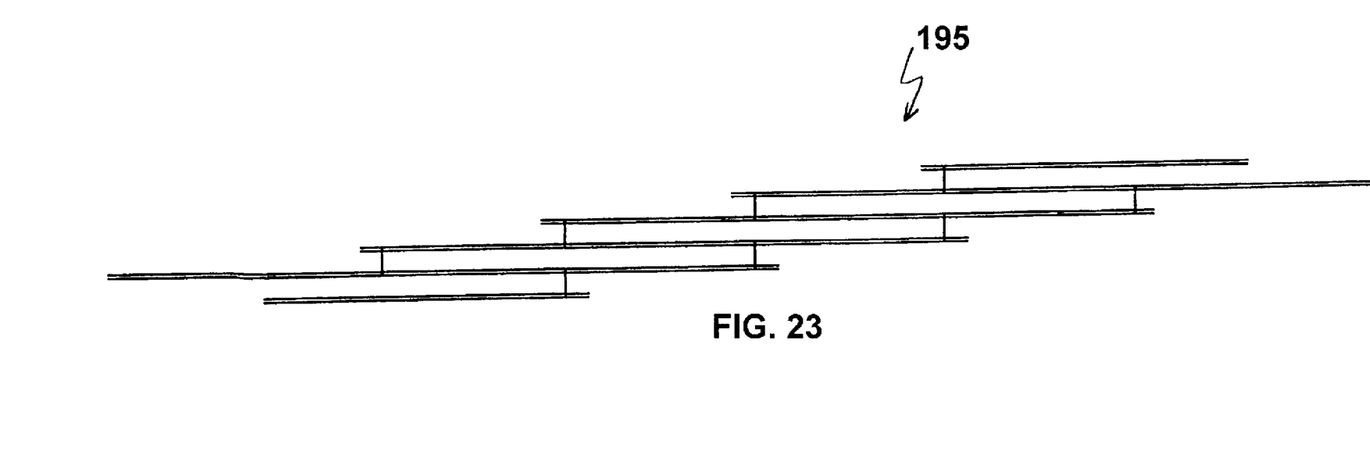

FIG. 23 shows the resulting airbag cushion assembly 195. Then, as shown in FIG. 13, the edge of end panel 130a is aligned with the edge of central panel 130b and the edge of end panel 130f is aligned with the edge of central panel 130e.

At this juncture and similar to the airbag cushion 10 described above, the entire airbag cushion perimeter can be sewn using essentially straight line stitch seams in a manner similar to that which was done in the above-described embodiment. Similarly, the inflator 112 may be inserted during this step or, as is known in the art, an opening (not shown) may be incorporated in the airbag cushion assembly, to permit the later insertion of such an inflator.

While the above-described compartmentalized airbag cushion designs 10 and 110 each include or contain five chamber compartments, it will be appreciated that the invention, if desired, can be practiced with a cushion design having as few as two but will typically include at least three such chamber compartments.

With the above-described compartmentalized airbag cushion designs, a method of fabricating an airbag cushion in the form of a linear arrangement of a plurality of compartments having a rectangular cross sectional shape with opposed longitudinal and lateral surfaces has been provided. A method of fabrication in accordance with the invention includes the step of joining together, for each compartment, at least respective first and second panel members forming an interior chamber adapted to be filled with an inflation fluid upon deployment of the airbag cushion and a planar partition wall separating the interior chambers of adjacent compartments, with each such joining effected from the outside of the respective compartment interior chamber.

As described above, the joinder or attachment of the cushion panel member so as to form the compartments is desirably simply effected from the outside of the compartment interior chambers. As a result, the invention permits the fabrication of such a compartmentalized airbag cushion without necessitating complicated handling such as associated with inversion of one or more of the airbag cushion panels or partially sewn airbag cushion compartments at one or more selected stages in the sewing process or the need to place a portion of a sewing machine or a projection therefrom into the compartment being formed in order to complete the sewing of the compartment.

As will be further appreciated, the above-described compartmentalized airbag cushions in accordance with the invention can be fabricated through the stitching together of the marginal edges of panel members cut along straight lines and having right corners. This permits and facilitates the use of a stitching pattern that results in relatively easy fabrication, an important consideration for economic high volume manufacturing processing. The design of the invention also permits and facilitates the use of a double needle chain stitch. The use of this strong stitch would be much more difficult and awkward in an airbag cushion design in which a typical stitching pattern were used.

In view of the above, the invention provides a compartmentalized airbag cushion which is of relatively simple design and construction. Further, the manufacture of the compartmentalized airbag cushion of the invention can be accomplished using relatively simple straight line stitching and is conducive to use in conjunction with automated manufacture and may thus economically permit the greater or more widespread use of compartmentalized airbag cushions in various inflatable restraint system installations.

From the foregoing it will be seen that this invention is one well adapted to various of the ends and objects herein above set forth together with the other advantages which are obvious and which are inherent to the structure.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag cushion comprising:

a linear arrangement of a plurality of compartments having a rectangular cross sectional shape with opposed longitudinal and lateral surfaces, each of said compartments formed by the joinder of at least first and second panel members to form an interior chamber adapted to be filled with an inflation fluid upon deployment of the airbag cushion and a planar partition wall separating the interior chambers of adjacent compartments, with the joinder of the at least first and second panel members for each of said compartments effected from the outside of the compartment interior chambers and, wherein, for each of said plurality of compartments, a single panel member forms at least one of the opposed longitudinal compartment surfaces and a partition wall separating the interior chambers of adjacent compartments.

2. An airbag cushion comprising:

a plurality of compartments each forming an interior chamber, each of said compartments adjacent at least one other of said compartments with a planar partition wall separating the interior chambers of each pair of adjacent compartments and permitting gas passage between the interior chambers of such adjacent compartments, with each of said compartments and planar partition walls formed by essentially straight line sewing of at least first and second panel members from the outside of the respective compartment wherein the first and second panel members are not sewn together along at least one section to form a passage opening to permit gas passage between the interior chambers of adjacent compartments and wherein the passage opening permits gas passage in only one direction.

3. An airbag cushion comprising:

a plurality of compartments each forming an interior chamber, each of said compartments adjacent at least one other of said compartments with a planar partition wall separating the interior chambers of each pair of adjacent compartments and permitting gas passage between the interior chambers of such adjacent compartments, with each of said compartments and planar partition walls formed by essentially straight line sewing of at least first and second panel members from the outside of the respective compartment and, for each of said plurality of compartments, a single panel member forms at least one of the opposed longitudinal compartment surfaces and a partition wall separating the interior chambers of adjacent compartments.

\* \* \* \* \*